United States Patent
Yoshimura et al.

(10) Patent No.: US 8,234,278 B2
(45) Date of Patent: Jul. 31, 2012

(54) INFORMATION PROCESSING DEVICE, INFORMATION PROCESSING METHOD, AND PROGRAM THEREFOR

(75) Inventors: Shunji Yoshimura, Tokyo (JP); Hiroshige Okamoto, Kanagawa (JP); Tatsuya Narahara, Kanagawa (JP)

(73) Assignee: Sony Corporation (JP)

( * ) Notice: Subject to any disclaimer, the term of this patent is extended or adjusted under 35 U.S.C. 154(b) by 496 days.

(21) Appl. No.: 12/220,385

(22) Filed: Jul. 24, 2008

(65) Prior Publication Data
US 2009/0030947 A1 Jan. 29, 2009

(30) Foreign Application Priority Data

Jul. 26, 2007 (JP) ................ P2007-194505

(51) Int. Cl.
*G06F 7/00* (2006.01)
*G06F 17/30* (2006.01)

(52) U.S. Cl. ........................... 707/736
(58) Field of Classification Search ............ 707/736, 707/999.101
See application file for complete search history.

(56) References Cited

U.S. PATENT DOCUMENTS

| | | | | |
|---|---|---|---|---|
| 5,974,218 A | * | 10/1999 | Nagasaka et al. | 386/200 |
| 6,160,950 A | * | 12/2000 | Shimazaki et al. | 386/249 |
| 2003/0016945 A1 | * | 1/2003 | Nakamura | 386/46 |
| 2005/0108200 A1 | * | 5/2005 | Meik et al. | 707/3 |
| 2007/0071406 A1 | * | 3/2007 | Koga et al. | 386/95 |
| 2009/0025039 A1 | * | 1/2009 | Bronstein et al. | 725/60 |

FOREIGN PATENT DOCUMENTS

| | | |
|---|---|---|
| JP | 2002044572 A | 2/2002 |
| JP | 2003-283993 A | 10/2003 |
| WO | 2007039995 A1 | 4/2007 |

OTHER PUBLICATIONS

Office Action from Japanese Application No. 2007-194505, dated Sep. 29, 2011.

* cited by examiner

*Primary Examiner* — Aleksandr Kerzhner
(74) *Attorney, Agent, or Firm* — Lerner, David, Littenberg, Krumholz & Mentlik, LLP

(57) ABSTRACT

An information processing device processes content according to an identified category for the content, the category being identified by first extracting characteristic data from the content. An extractor extracts characteristic data from the content. An identifying component identifies a category for the content on the basis of the characteristic data extracted by the extracting means. An executing component executes set processing of the content using a method according to the category identified by the identifying component. In so doing, the optimal content category for the set processing is identified.

12 Claims, 5 Drawing Sheets

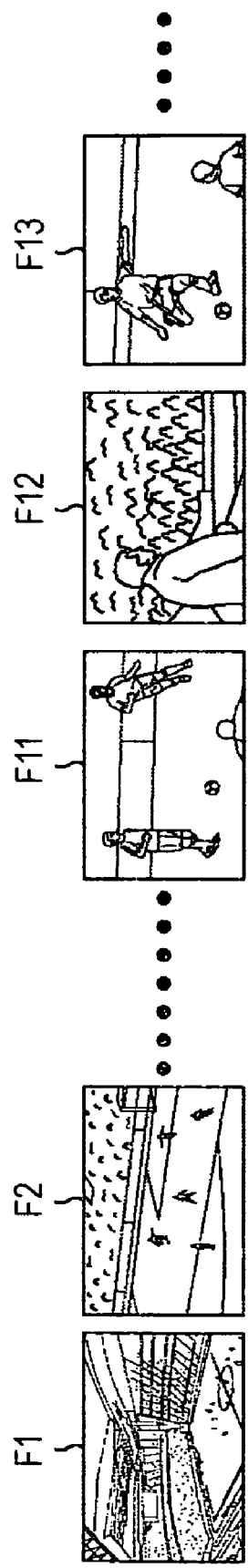
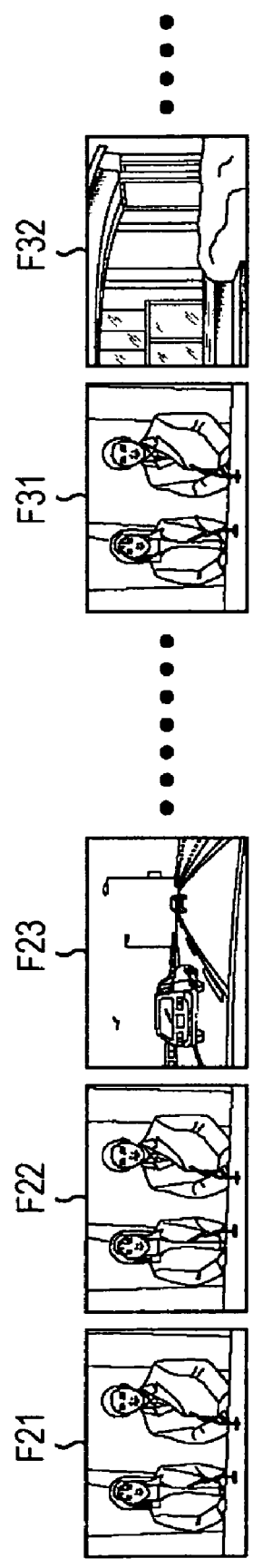

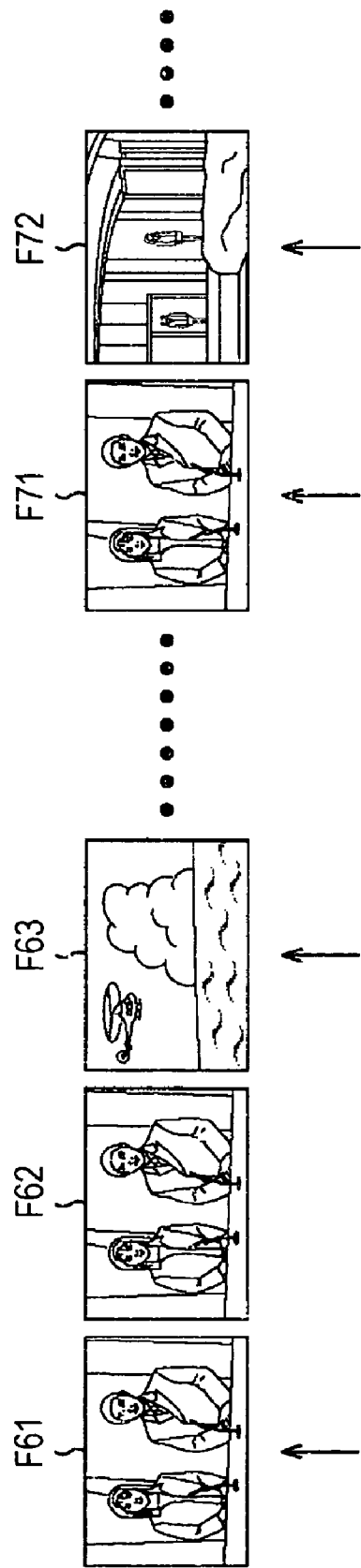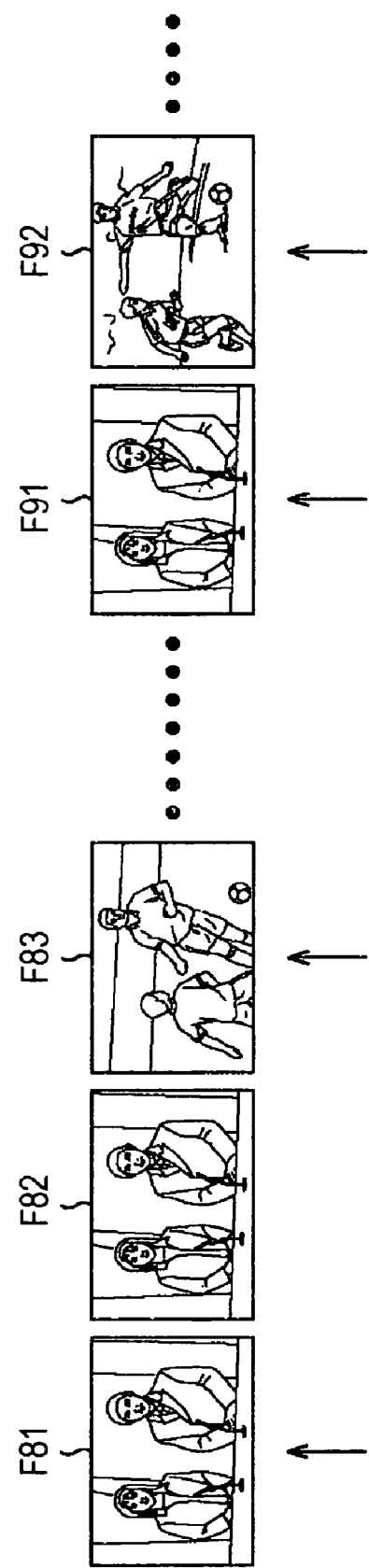

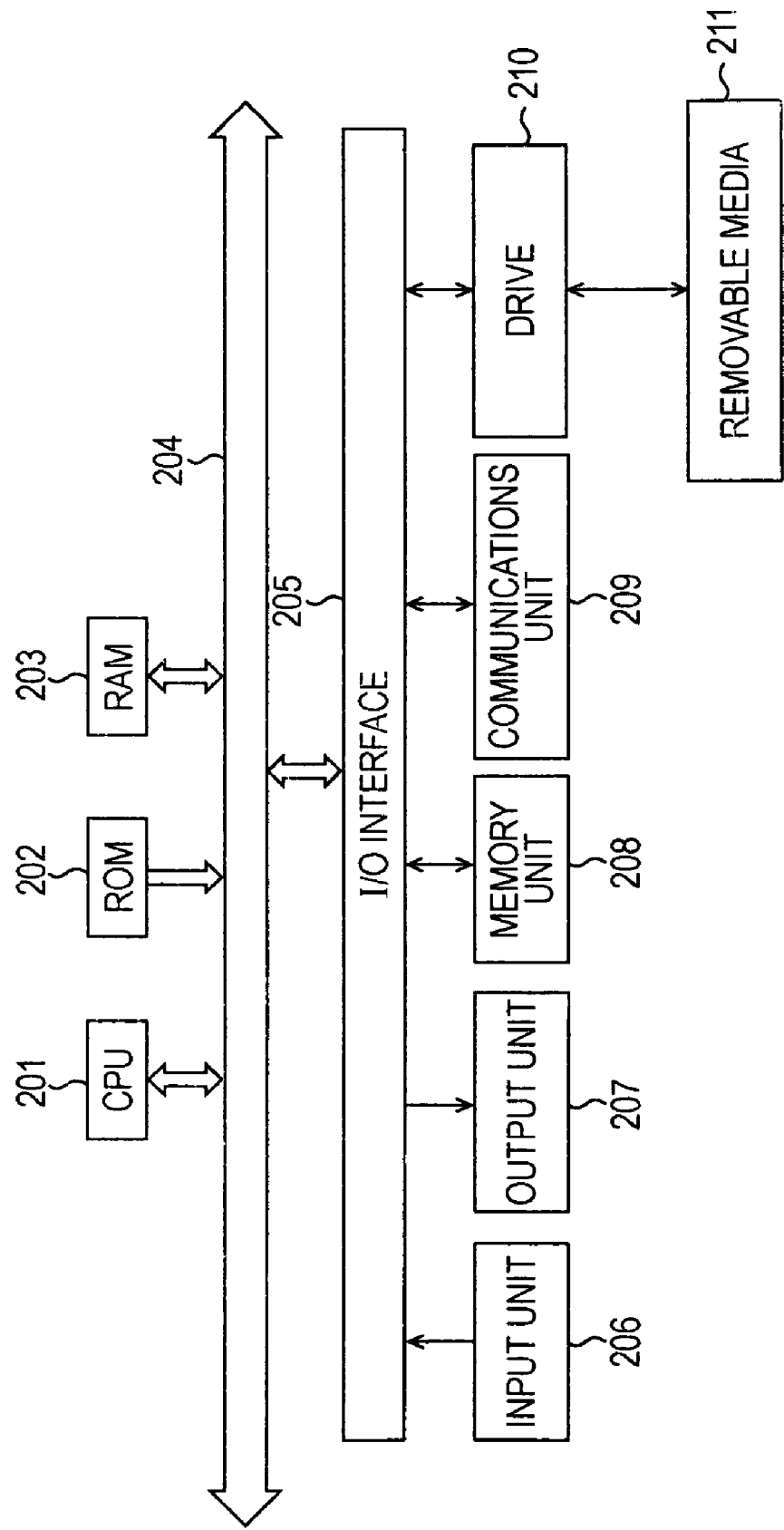

ND PROGRAM THEREFOR

INFORMATION PROCESSING DEVICE, INFORMATION PROCESSING METHOD, AND PROGRAM THEREFOR

CROSS-REFERENCE TO RELATED APPLICATIONS

The present application claims priority from Japanese Patent Application No. JP 2007-194505, filed in the Japanese Patent Office on Jul. 26, 2007, the entire content of which is incorporated herein by reference.

BACKGROUND OF THE INVENTION

1. Field of the Invention

The present invention relates to an information processing device, an information processing method, and a program therefor. More particularly, the present invention relates to an information processing device, an information processing method, and a program therefor, such that when set processing is conducted on content on the basis of content category, the optimal content category for such processing is identified, and the processing is executed using a method according to the identified category.

2. Description of the Related Art

As digital television broadcasting becomes more prevalent, the use of electronic program guides (EPG) is also becoming the norm.

In addition to program titles and broadcast times, the data constituting an EPG also includes information that indicates program categories. For example, such data may include information indicating genre, such as whether a program is a news program or a soccer program (hereinafter referred to as genre information).

Meanwhile, the program genre information acquired from an EPG is used for various functions in recording and playback devices.

For example, there exists a function whereby summary footage is created from the recorded footage and played back, in order to enable the viewer to easily grasp the content of a large amount of recorded footage. This function, known as a digest function, uses program genre information as a means to improve the accuracy thereof (cf. Japanese Unexamined Patent Application No. 2003-283993).

In JP-A-2003-283993, set characteristic quantities detected from recorded footage are weighted on the basis of program genre information acquired from an EPG. On the basis of these results, the footage for digest playback is determined.

SUMMARY OF THE INVENTION

However, an EPG is primarily for the viewer's convenience in selecting a program, and is created by the broadcasting station, for example. Moreover, the genre information indicated therein is categorized for program selection by the viewer. Consequently, such categories are not necessarily suitable for device-based processing (such as digest playback, for example).

The present invention, being devised in the light of such circumstances, enables optimal content categories to be identified for device-based processing.

An information processing device in accordance with an embodiment of the present invention is provided with the following: an extractor that extracts characteristic data from the content; an identifying component that identifies a category for the content on the basis of the characteristic data extracted by the extractor; and an executing component that executes set processing on the content using a method according to the category identified by the identifying component.

The executing component may also select a set processing method according to the category identified by the identifying component, and then execute the set processing using the selected method.

The content may also contain video data, and the set processing may be processing that detects chapter points in the content for digest playback, wherein, according to the category identified by the identifying component, the executing component selects characteristic data used for chapter point detection as well as a computational method for detecting chapter points on the basis of this characteristic data. The executing component may then detect chapter points using the selected characteristic data and computational method.

The information processing device may also be further provided with a heuristic component that creates parameters whereby certain content belonging to a set category can be identified as belonging to the set category. The identifying component may then identify the category of the content on the basis of the parameters created by the heuristic component.

The identifying component may also receive, as input, parameters created by an external heuristic device, whereby certain content belonging to a set category can be identified as belonging to the set category. The identifying component may then identify the category of the content on the basis of the input parameters.

An information processing method in accordance with an embodiment of the present invention includes: an extracting step, wherein characteristic data for a set of content is extracted; an identifying step, wherein a category for the content is identified on the basis of the characteristic data extracted in the extracting step; and an executing step, wherein set processing is executed on the content using a method according to the category identified in the identifying step.

A program in accordance with an embodiment of the present invention causes a computer to execute information processing that processes content in a set way, the program including: an extracting step, wherein characteristic data for a set of content is extracted; an identifying step, wherein a category for the content is identified on the basis of the characteristic data extracted in the extracting step; and an executing step, wherein set processing is executed on the content using a method according to the category identified in the identifying step.

In the information processing device, information processing method, and program in accordance with embodiments of the present invention, characteristic data for a set of content is extracted, a category for the content is identified on the basis of the extracted characteristic data, and the content is then processed in a set way using a method in accordance with the identified category.

As a result of the present invention, an optimal content category is identified for executing set processing, and content is processed in a set way using a method in accordance with the category thereof.

BRIEF DESCRIPTION OF THE DRAWINGS

FIG. 2 shows an example of heuristic data;

FIG. 3 shows another example of heuristic data;

FIG. 5 shows another example of a program subjected to chapter point detection;

FIG. 6 shows another example of a program subjected to chapter point detection; and FIG. 7 is a block diagram illustrating an exemplary configuration of a personal computer.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment(s) supporting the claimed invention is described in this specification. Thus, even if an element in the following embodiment(s) is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Figure 1:
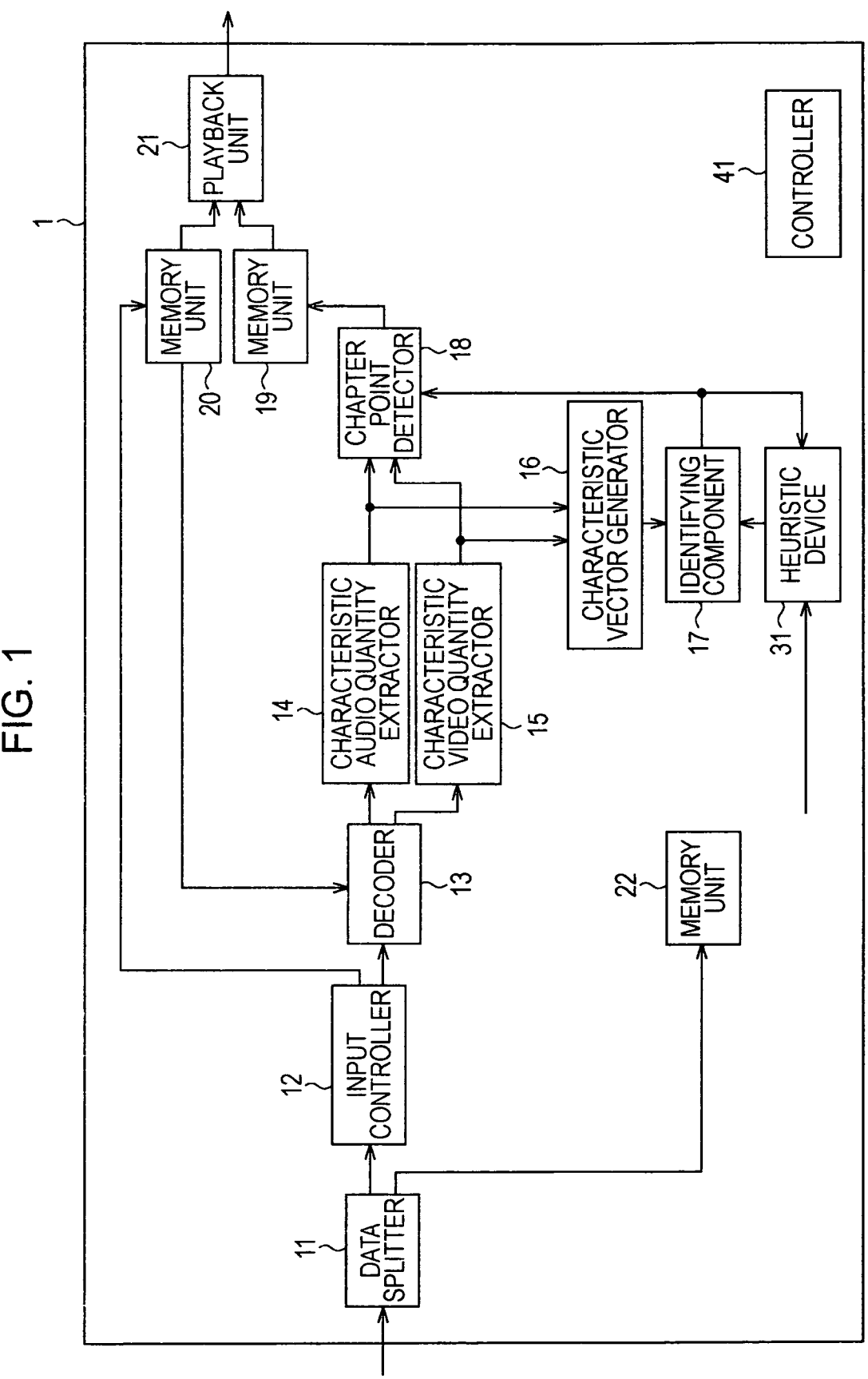
FIG. 1 is a block diagram illustrating an exemplary configuration of a recording/playback device 1 to which the present invention has been applied.

An information processing device in accordance with an embodiment of the present invention is provided with the following: extracting means (such as the characteristic audio data extractor 14 or the characteristic video data extractor 15 in FIG. 1, for example) that extracts characteristic data from a set of content; identifying means (such as the identifying component 17 in FIG. 1, for example) that identifies a category for the content on the basis of the characteristic data extracted by the extracting means; and executing means (such as the chapter point detector 18 in FIG. 1, for example) that executes set processing on the content using a method in accordance with the category identified by the identification means.

The information processing method and program in accordance with an embodiment of the present invention includes the following steps: an extracting step (such as the processing of the characteristic audio data extractor 14 or the characteristic video data extractor 15 in FIG. 1, for example), wherein characteristic data for a set of content is extracted; an identifying step (such as the processing of the identifying component 17 in FIG. 1, for example), wherein a category for the content is identified on the basis of the characteristic data extracted in the extracting step; and an executing step (such as the processing of the chapter point detector 18 in FIG. 1, for example), wherein set processing is executed on the content using a method that depends on the category identified in the identifying step.

FIG. 1 shows an exemplary configuration of a recording/playback device 1 to which the present invention has been applied. The recording/playback device 1 records programs from a received digital television broadcast, and includes functions enabling digest playback of recorded programs. When performing digest playback, the recording/playback device 1 detects footage to be played back in digest playback mode, and then assigns chapters to the footage. However, as described hereinafter, the recording/playback device 1 also identifies a program category suitable for detecting the footage to be assigned chapters (hereinafter referred to as chapter points, when appropriate), and detects chapter points using a method in accordance with the identified program category.

Data, such as digital data from a digital television broadcast signal, for example, is received by a receiver (not shown in the drawings), and then input from the receiver into a data splitter 11. The data splitter 11 splits the input digital data into EPG (electronic program guide) data and audio/video data (hereinafter referred to as AV data, when appropriate).

The data splitter 11 then supplies the split EPG data to a memory unit 22 where the EPG data is stored, while also supplying the split AV data to the input controller 12.

When recording a received broadcast program, the input controller 12 supplies AV data supplied from the data splitter 11 to the memory unit 20 where the AV data is stored.

The input controller 12 also supplies the AV data supplied from the data splitter 11 to a decoder 13, wherein the AV data is subject to chapter point detection.

The decoder 13, taking either AV data supplied from the input controller 12 or AV data read from the memory unit 20, splits the AV data to be subject to chapter point detection into audio data and video data. The audio data is supplied to a characteristic audio data extractor 14, while the video data is supplied to a characteristic video data extractor 15.

From the audio data supplied from the decoder 13, the characteristic audio data extractor 14 extracts characteristic audio data, such as volume levels, frequency spectra, and left/right channel correlation values. This extracted characteristic audio data is then supplied to a characteristic vector generator 16 and a chapter point detector 18.

From the video data supplied from the decoder 13, the characteristic video data extractor 15 extracts characteristic video data, such as color histograms, difference pictures, and reduced images. The extracted characteristic video data is then supplied to the characteristic vector generator 16 and the chapter point detector 18.

From among the characteristic data supplied from the characteristic audio data extractor 14 and the characteristic video data extractor 15, the characteristic vector generator 16 selects set characteristic data to be used in an identifying component 17 for identifying the category of the program to be assigned chapters. The characteristic vector generator 16 then generates a vector having the values of the selected characteristic data as the elements thereof (hereinafter referred to as a characteristic vector). The characteristic vector generator 16 then supplies the generated characteristic vector to the identifying component 17.

On the basis of the characteristic vector supplied from the characteristic vector generator 16, the identifying component 17 identifies a program category (in the present example, a program category suitable for chapter point detection).

For example, the identifying component 17 may be configured using discriminators such as linear discriminators, nonlinear discriminators, or a neural net, wherein each element constituting a characteristic vector is arrayed in a predefined characteristic space that is divided by lines or curves generated on the basis of identification parameters set by a heuristic device 31. The identifying component 17 then identifies a program category on the basis of the subset of the characteristic space to which the distribution of the arrayed elements belongs.

The identifying component 17 then supplies the identification result to the chapter point detector 18 as information indicating a program category (hereinafter referred to as category information).

The chapter point detector 18 detects chapter points according to the program category indicated by the category information supplied from the identifying component 17. The chapter point detector 18 then supplies information indicating the detected chapter points (hereinafter referred to as chapter point information) to a memory unit 19, where the chapter point information is stored.

For example, from among the characteristic data supplied from the characteristic audio data extractor 14 and the characteristic video data extractor 15, the chapter point detector 18 may select characteristic data according to the program category, while in addition executing computational processing in accordance the program category.

More specifically, in this case, the chapter point detector 18 stores executable data (for example, programs containing parameters and algorithms) for selecting and computing characteristic data according to program category, the executable data being stored on a per-category basis. By selecting and executing a set of executable data according to the program category, the chapter point detector 18 detects chapter points.

A playback unit 21 reads out the AV data retained in the retainer 20, and then performs either regular playback or digest playback. When performing digest playback, the playback unit 21 assigns chapters to the footage (video frames, for example) indicated in the chapter point information stored in the memory unit 19. The playback unit 21 then appropriately reads out from the memory unit 20 and plays back the footage to which chapters have been assigned. In other words, the footage to which chapters have been assigned are sampled and then played back.

The heuristic device 31 conducts processing using heuristic models and supplies the heuristic results as parameters to be set in the identifying component 17, the parameters being used in the identifying component 17 to identify program categories. More specifically, these parameters may be used in order to generate the lines or curves used for subdividing the characteristic space, for example.

As shown in FIG. 2, in a program broadcasting a soccer game, there are typically many scenes containing a soccer field. For this reason, many color histograms having a high frequency of green, for example, can be acquired (continuously, for example) from a program broadcasting a soccer game.

Thus, when performing heuristic processing, the heuristic device 31 takes a program broadcasting a soccer game to be heuristic data for the category "Soccer Program", the program being made up of scenes containing footage of a soccer field, as shown in FIG. 2. The heuristic device 31 then supplies the identifying component 17 with a characteristic vector of the per-frame color histograms acquired from the heuristic data. Subsequently, the heuristic device 31 refers to the identification results from the identifying component 17 and generates identification parameters to be set in the identifying component 17 that enable the identifying component 17 to identify the category as being "Soccer Program". (As a more specific example, the identification parameters may be used to generate lines or other objects that subdivide the characteristic space, such that the distribution in the characteristic space of green frequencies acquired from color histograms becomes situated within a "Soccer Program" region.)

In addition, as shown in FIG. 3, programs that report on incidents or events include many scenes containing footage of one or more persons and a studio. For this reason, many color histograms with high frequencies of colors characteristic to the one or more persons and the studio can be acquired from a program that reports on incidents or events.

Thus, when performing heuristic processing, the heuristic device 31 takes a program reporting on incidents or events to be heuristic data for the category "News Program", the program being made up of scenes containing footage of one or more persons and a studio, as shown in FIG. 3. The heuristic device 31 then supplies the identifying component 17 with a characteristic vector of the per-frame color histograms acquired from the heuristic data. Subsequently, the heuristic device 31 refers to the identification results from the identifying component 17 and generates identification parameters to be set in the identifying component 17 that enable the identifying component 17 to identify the category as being "News Program". (As a more specific example, the identification parameters may be used to generate lines or other objects that subdivide the characteristic space, such that the distribution in the characteristic space of frequencies of specified colors becomes situated within a "News Program" region.)

It should be appreciated that heuristic processing can also be conducted without the use of heuristic data. For example, the characteristic space may be categorized into several patterns from the arrangement of elements in a characteristic vector, and then identification parameters may be generated so as to realize these categories.

Returning to FIG. 1, a controller 41 controls the overall operation of the recording/playback device 1, and causes processing for functions such as program recording, regular playback, and digest playback to be executed therein.

Chapter point detection processing will now be described in more detail.

The case will be described wherein chapter points are detected from a program broadcasting a soccer game like that shown in FIG. 4. The upper row in FIG. 4 illustrates footage constituting the program broadcasting a soccer game, while the lower row in FIG. 4 illustrates the volume level of the audio that is output simultaneously with the above footage.

Figure 4:
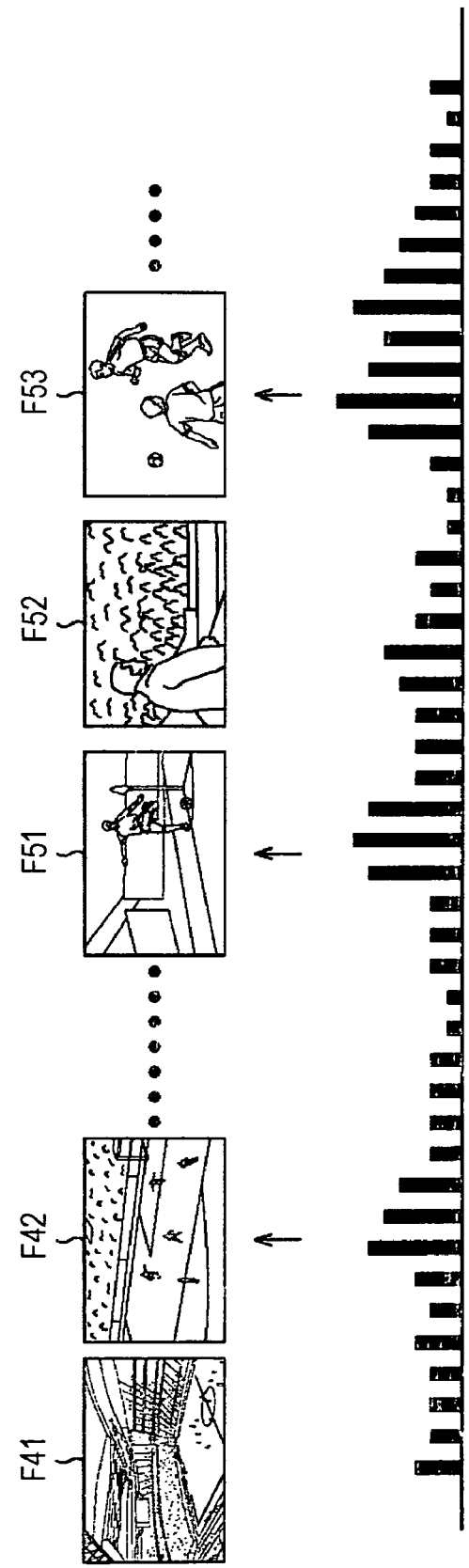
FIG. 4 shows an example of a program subjected to chapter point detection.

In this case, the characteristic audio data extractor 14 extracts characteristic audio data from the audio data, supplied from the decoder 13, for the audio whose volume level fluctuates as shown in FIG. 4. The characteristic audio data includes information such as volume levels, frequency spectra, and left/right correlation values. The characteristic audio data extractor 14 then supplies the extracted characteristic audio data to the characteristic vector generator 16 and the chapter point detector 18.

The characteristic video data extractor 15 extracts characteristic video data from the video data, supplied from the decoder 13, having the footage illustrated in FIG. 4. The characteristic video data includes information such as color histograms, difference pictures, and reduced images. The characteristic video data extractor 15 then supplies the extracted characteristic video data to the characteristic vector generator 16 and the chapter point detector 18.

In the present example, the characteristic vector generator 16 uses the color histograms supplied by the characteristic video data extractor 15 to generate a characteristic vector, the color histograms being selected from among the characteristic data supplied by the characteristic audio data extractor 14 and the characteristic video data extractor 15. The characteristic vector generator 16 then supplies the generated characteristic vector to the identifying component 17.

As described with reference to FIG. 2 above, a characteristic vector is generated from the footage illustrated in FIG. 4 and supplied to the identifying component 17, the characteristic vector containing many color histograms having a high frequency of green, for example.

As described earlier, the identifying component 17 is learning that a characteristic vector like the above can be identified as being from a program in the category "Soccer Program". For this reason, upon receiving the above characteristic vector (containing many color histograms having a high frequency of green) that was supplied from the characteristic vector generator 16, the identifying component 17 identifies the program corresponding to the characteristic vector as being in the "Soccer Program" category. The identifying component 17 then supplies the identification result to the chapter point detector 18 as category information indicating that the category is "Soccer Program".

One characteristic of programs broadcasting a soccer game is that the volume level rises during scenes of excitement, such as during the kickoff, when a goal can potentially be made, and when a goal is scored (cf. footage F42, F51, and F53, as indicated by the arrows in the example shown in FIG. 4).

More specifically, since such scenes of excitement are of interest to the user, it is desirable that these scenes be played back in digest playback mode. Thus, when category information is supplied from the identifying component 17 indicating that the program category is "Soccer Program", the chapter point detector 18 selects the volume level values from among the characteristic data supplied from the characteristic audio data extractor 14 and the characteristic video data extractor 15, and then conducts computation such that chapter points are assigned to scenes of excitement wherein the acquired volume level exceeds a fixed level. The chapter point detector 18 then supplies chapter point information for the chapter points detected as a result of such computation to the memory unit 19, wherein the chapter information is stored.

In this way, when the program category is identified as being "Soccer Program" and scenes of excitement are detected as chapter points, footage such as F42, F51, and F53 of those scenes of excitement (e.g., the kickoff, potential goals, and scored goals) are played back in the digest playback mode.

Next, detecting chapter points from a program that reports on incidents or events like that illustrated in FIG. 5 will be described.

The characteristic audio data extractor 14 extracts a characteristic audio data from the audio data supplied from the decoder 13, the characteristic audio data including information such as volume levels, frequency spectra, and left/right correlation values. The characteristic audio data extractor 14 then supplies the extracted characteristic audio data to the characteristic vector generator 16 and the chapter point detector 18.

The characteristic video data extractor 15 extracts characteristic video data from the video data supplied from the decoder 13, the characteristic video data including information such as color histograms, difference pictures, and reduced images. The characteristic video data extractor 15 then supplies the extracted characteristic video data to the characteristic vector generator 16 and the chapter point detector 18.

In the present example, the characteristic vector generator 16 uses the color histograms supplied by the characteristic video data extractor 15 to generate a characteristic vector, the color histograms being selected from among the characteristic data supplied by the characteristic audio data extractor 14 and the characteristic video data extractor 15. The characteristic vector generator 16 then supplies the generated characteristic vector to the identifying component 17.

As described with reference to FIG. 3 above, a characteristic vector is generated from the footage illustrated in FIG. 5 and supplied to the identifying component 17, the characteristic vector containing many color histograms having a high frequency of colors characteristic to the one or more persons and the studio displayed in the corresponding footage.

As described earlier, the identifying component 17 is learning that a characteristic vector like the above can be identified as being from a program in the category "News Program". For this reason, upon receiving the above characteristic vector (containing many color histograms having a high frequency of colors characteristic to the one or more persons and the studio) that was supplied from the characteristic vector generator 16, the identifying component 17 identifies the program corresponding to the characteristic vector as being in the "News Program" category. The identifying component 17 then supplies the identification result to the chapter point detector 18 as category information indicating that the category is "News Program".

One characteristic of programs that report on incidents or events is that the program footage successively switches between footage of one or more announcers reporting the news and footage corresponding to an incident or other occurrence (cf. the program switching to the footage F61, F63, F71, and F72, as indicated by the arrows in the example shown in FIG. 5).

More specifically, since the scenes where the footage switches are the initial scenes of footage wherein the one or more announcers report the news or wherein footage corresponding to an incident is displayed, it is desirable that these scenes be played back in digest playback mode. Thus, when category information is supplied from the identifying component 17 indicating that the program category is "News Program", the chapter point detector 18 selects the color histograms and the difference pictures from among the characteristic data supplied from the characteristic audio data extractor 14 and the characteristic video data extractor 15. The chapter point detector 18 uses this data to conduct computation such that chapter points are assigned to positions (frames, for example) wherein a break occurs in the continuity of the footage (hereinafter referred to as a cut point). (In other words, chapters points are assigned to the positions where the footage switches between the one or more announcers reporting the news and the footage corresponding to an incident.) The chapter point detector 18 then supplies chapter point information for the chapter points detected as a result of such computation to the memory unit 19, wherein the chapter information is stored.

In this way, when the program category is identified as being "News Program" and cut points are detected as chapter points, the footage F61, F63, F71, and F72 of those scenes (wherein the footage switches between the one or more announcers reporting the news and the footage corresponding to an incident) is played back in the digest playback mode.

Next, detecting chapter points from a program that describes the results of a soccer game (i.e., a digest program) like that shown in FIG. 6 will be described.

The characteristic audio data extractor 14 extracts characteristic audio data from the audio data supplied from the decoder 13, the characteristic audio data including information such as volume levels, frequency spectra, and left/right correlation values. The characteristic audio data extractor 14 then supplies the extracted characteristic audio data to the characteristic vector generator 16 and the chapter point detector 18.

The characteristic video data extractor 15 extracts characteristic video data from the video data supplied from the decoder 13, the characteristic video data including information such as color histograms, difference pictures, or reduced images. The characteristic video data extractor 15 then supplies the extracted characteristic video data to the characteristic vector generator 16 and the chapter point detector 18.

In the present example, the characteristic vector generator 16 uses the color histograms supplied by the characteristic video data extractor 15 to generate a characteristic vector, the color histograms being selected from among the characteristic data supplied by the characteristic audio data extractor 14 and the characteristic video data extractor 15. The characteristic vector generator 16 then supplies the generated characteristic vector to the identifying component 17.

From the footage illustrated in FIG. 6, a characteristic vector is generated containing many color histograms having a high frequency of colors characteristic to the one or more persons and the studio, and then supplied to the identifying component 17.

As described earlier, the identifying component 17 is learning that a characteristic vector like the above can be identified as being from a program in the category "News Program". For this reason, upon receiving the above characteristic vector (containing many color histograms having a high frequency of colors characteristic to the one or more persons and the studio) that was supplied from the characteristic vector generator 16, the identifying component 17 identifies the program corresponding to the characteristic vector as being in the "News Program" category. The identifying component 17 then supplies the identification result to the chapter point detector 18 as category information indicating that the category is "News Program".

Upon being supplied with category information from the identifying component 17 indicating that the program category is "News Program", the chapter point detector 18 selects the color histograms and the difference pictures from among the characteristic data supplied from the characteristic audio data extractor 14 and the characteristic video data extractor 15. The chapter point detector 18 then uses this data to conduct computation such that chapter points are assigned to the cut points, similar to the example in FIG. 5. The chapter point detector 18 then supplies chapter point information for the chapter points detected as a result of such computation to the memory unit 19, wherein the chapter information is stored.

One characteristic of programs that describe the results of a soccer game (i.e., a digest program) is that the program footage successively switches between footage of one or more announcers explaining the soccer results and footage of the game (cf. the program switching to the footage F81, F82, F91, and F92, as indicated by the arrows in the example shown in FIG. 6). This characteristic corresponds to the characteristic of a program that reports on incidents or events (cf. FIG. 5), in that both programs switch between footage of one or more announcers and other, different footage.

More specifically, since the scenes where the footage switches are the initial scenes of footage wherein the one or more announcers explain the soccer results or footage of the game, it is desirable that these scenes be played back in digest playback mode, similar to the case wherein the program category is identified as "News Program".

Thus, although a program describing the results of a soccer game like that illustrated in FIG. 6 is taken to be in the "Soccer Program" genre in the EPG, the category is identified as being "eNews Program" as described above, and chapter points are detected using a method similar to that of the case for programs of category "News Program". In so doing, digest playback is conducted that is optimal for a program that describes the results of a soccer game. In the case of the example shown in FIG. 6, footage such as F81, F83, F91, and F92 (wherein the footage switches between the one or more announcers describing the soccer results and the footage of the game) is played back in the digest playback mode.

If, for example, chapter points are detected for the program illustrated in FIG. 6 according to the category in the EPG (i.e., chapter points are assigned to scenes of excitement like that of the example in FIG. 4), then suitable footage is not played back during the digest playback mode.

Thus, as described above, program category identification is conducted that is suitable for detecting chapter points to be used during digest playback, the chapter points being detected on the basis of the identified category.

It should be appreciated that while the foregoing described, by way of example, chapter point detection for use in the case of digest playback of a broadcast program, the invention may be similarly applied to chapter point detection in the case of digest playback of other content. For example, the invention may also be applied to personal content recorded using a camcorder. Although it is necessary to perform heuristics for categorizing personal content, the heuristic device 31 is built into the recording/playback device 1 as shown in the example in FIG. 1, and thus such heuristic learning is easily performed.

It should be further appreciated that the heuristic device 31 need not be built into the recording/playback device 1, and identification parameters generated by an external heuristic device may be supplied to the recording/playback device 1 and set in the identifying component 17. These identification parameters may be supplied to the recording/playback device 1 by recording the identification parameters onto a recording medium readable by the recording/playback device 1, or alternatively, by providing the identification parameters via a network in the case where the recording/playback device 1 is connected to the same network.

Additionally, it should be appreciated that although the foregoing described, by way of example, the identification of a program category suitable for the detection of chapter points to be used in digest playback, a program category may also be identified in order to suit other processes.

Additionally, while the foregoing did not include discussion of the timings whereby category identification processing is executing, such processing may be conducted simultaneously with the recording of the program. More specifically, the input controller 12 may supply AV data to the decoder 13 while also supplying the AV data to the memory unit 20 for storage therein (i.e., while recording the AV data).

Category identification processing as described above is executed on the basis of the AV data supplied from the input controller 12, the category identification processing being executed after the processing of the decoder 13 and before the processing of the identifying component 17. However, it should be appreciated that the chapter point detector 18 need not be activated at that point, and the characteristic data supplied from the characteristic audio data extractor 14 and the characteristic video data extractor 15 may, for example, be stored in the chapter point detector 18 or discarded.

Furthermore, chapter point detection may also be conducted after a program has been recorded and the program category has been identified. AV data stored in the memory unit 20 is read out by the decoder 13, and respective sets of characteristic data are extracted from the AV data by the characteristic audio data extractor 14 and the characteristic video data extractor 15. Subsequently, in the chapter point detector 18, characteristic data is selected from among the extracted characteristic data according to the previously identified program category, and chapter points are detected.

Additionally, the characteristic data in the characteristic vector required for category identification may be extracted from the entire program, or from a portion thereof, such as that up to a predefined amount of time (e.g., 10 minutes) from the beginning of the program, for example. If characteristic data is extracted from the entire program, category identification is conducted after the program has finished recording, as described above. However, if characteristic data is extracted from a portion of the program, a buffer may be provided between the characteristic audio data extractor 14 and the chapter point detector 18, as well as between the characteristic video data extractor 15 and the chapter point detector 18. If the characteristic data are stored in the respective buffers until the characteristic vector is generated and the category is identified, then chapter point detection may commence immediately after the category is identified.

Additionally, although the foregoing described, by way of example, the program category as being either "News Program" or "Soccer Program", other categories may also be identified, such as "Music Program". Programs broadcasting a song or musical performance include long periods of talking between one or more hosts and one or more performers, and thus in some cases treating the category of such programs as being "News Program" enables detection of chapter points suitable for digest playback.

Moreover, the categories are not limited to correspondence with program genres, and may be subject to different criteria. For example, programs that broadcast songs or musical performances include programs such as the following:

programs wherein more time is devoted to the actual songs or musical performances, rather than to talking between the one or more announcers and performers;
  programs containing long periods of talking between the one or more announcers and the performers; and
  programs recorded at a concert hall or similar venue that contain audience cheering or applause.

If the above types of programs can be identified as separate categories, then chapter points can be detected that are even better suited to digest playback.

Additionally, although in the foregoing EPG data was not utilized in category identification, the accuracy of program category identification may be improved by additionally using EPG information stored in the memory unit 22.

FIG. 7 is a block diagram illustrating an exemplary hardware configuration of a personal computer that executes the above series of processes by means of a program.

In the computer, a central processing unit (CPU) 201, read-only memory (ROM) 202, random access memory (RAM) 203, and a bus 204 are mutually interconnected.

Furthermore, an input/output (I/O) interface 205 is connected to the bus 204. The I/O interface 205 is connected to the following: an input unit 206, having components such as a keyboard, mouse, and microphone; an output unit 207, having components such as a display and speakers; a storage unit 208, having components such as a hard disk and non-volatile memory; a communications unit 209, having components such as a network interface; and a drive 210, which uses removable media 211 such as magnetic disks, optical discs, magneto-optical disks, or semiconductor memory.

In the computer configured as above, the foregoing series of processes may be conducted as a result of the CPU 201 loading a program stored in the storage unit 208 into the RAM 203 via the I/O interface 205 and the bus 204, for example.

The program executed by the computer (i.e., the CPU 201) may be recorded on removable media 211 (more specifically, on packaged media such as magnetic disks (including flexible disks), optical discs (such as a Compact Disc read-only memory (CD-ROM) or a digital versatile disc (DVD)), magneto-optical disks, or semiconductor memory), or alternatively, the program may be provided via a wired or wireless transmission medium such as a local area network, the Internet, or a digital satellite broadcast.

Subsequently, the program may be installed in the storage unit 208 via the I/O interface 205 by inserting the removable media 211 into the drive 210, or alternatively, by receiving the program via a wired or wireless transmission medium using the communications unit 209. It is also possible to install the program in the ROM 202 or the storage unit 208 in advance.

It should be appreciated that in the program executed by the computer, processes may be conducted in a time series following the order as described in the present specification, or alternatively, processes may be conducted by being called as needed, for example.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
  extracting means that extracts characteristic data from content;
  identifying means that identifies a category for the content on the basis of the characteristic data extracted by the extracting means; and
  executing means that executes set processing of the content, using a method according to the category identified by the identifying means,
  the characteristic data is used to form a characteristic vector, and the category is identified by arraying each element of the characteristic vector in a characteristic space that is divided by lines or curves and identifying the category based on a subset of the characteristic space to which the distribution of the arrayed elements belongs,
  the content including video content, and the characteristic vector including per-frame color histograms,
  wherein division of the characteristic space is based on the distribution in the characteristic space of frequencies of specified colors.

2. The information processing device according to claim 1, wherein the executing means selects a set processing method according to the category identified by the identifying means, and executes the set processing using the selected method.

3. The information processing device according to claim 2, wherein
  the set processing detects chapter points in the content, the chapter points being played back in a digest playback mode, and
  the executing means selects, according to the category identified by the identifying means, characteristic data to be used in chapter point detection, as well as a computational method for detecting chapter points on the basis of the selected characteristic data, the executing means detecting chapter points on the basis of the selected characteristic data and computational method.

4. The information processing device according to claim 1, further comprising:
  heuristic means that generates parameters enabling certain content belonging to a set category to be identified as belonging to the set category;
  wherein the identifying means identifies the category of the content on the basis of the parameters generated by the heuristic means.

5. The information processing device according to claim 1, wherein
  the identifying means receives, as input, parameters enabling certain content belonging to a set category to be identified as belonging to the set category, the set category being generated by an external heuristic device, and
  the identifying means identifies the category of the content on the basis of the input parameters.

6. An information processing method, comprising the steps of:

extracting characteristic data from content;

identifying a category for the content on the basis of the characteristic data extracted in the processing of the extracting step; and executing set processing of the content, using a method according to the category identified in the processing of the identifying step, the characteristic data is used to form a characteristic vector, and the category is identified by arraying each element of the characteristic vector in a characteristic space that is divided by lines or curves and identifying the category based on a subset of the characteristic space to which the distribution of the arrayed elements belongs, the content including video content, and the characteristic vector including per-frame color histograms, wherein division of the characteristic space is based on the distribution in the characteristic space of frequencies of specified colors.

7. A non-transitory computer-readable medium storing a program, executed on a computer, that executes information processing that processes content in a set way, the program comprising the steps of:

extracting characteristic data from content;

identifying a category for the content on the basis of the characteristic data extracted in the processing of the extracting step; and executing set processing of the content, using a method according to the category identified in the processing of the identifying step, the characteristic data is used to form a characteristic vector, and the category is identified by arraying each element of the characteristic vector in a characteristic space that is divided by lines or curves and identifying the category based on a subset of the characteristic space to which the distribution of the arrayed elements belongs, the content including video content, and the characteristic vector including per-frame color histograms, wherein division of the characteristic space is based on the distribution in the characteristic space of frequencies of specified colors.

8. An information processing device, comprising:

an extractor that extracts characteristic data from content;

an identifying component that identifies a category for the content on the basis of the characteristic data extracted by the extractor; and an executing component that executes set processing of the content, using a method according to the category identified by the identifying component, the characteristic data is used to form a characteristic vector, and the category is identified by arraying each element of the characteristic vector in a characteristic space that is divided by lines or curves and identifying the category based on a subset of the characteristic space to which the distribution of the arrayed elements belongs, the content including video content, and the characteristic vector including per-frame color histograms, wherein division of the characteristic space is based on the distribution in the characteristic space of frequencies of specified colors.

9. The information processing device according to claim 8, wherein the executing component selects a set processing method according to the category identified by the identifying component, and executes the set processing using the selected method.

10. The information processing device according to claim 9, wherein the set processing detects chapter points in the content, the chapter points being played back in a digest playback mode, and the executing component selects, according to the category identified by the identifying component, characteristic data to be used in chapter point detection, as well as a computational method for detecting chapter points on the basis of the selected characteristic data, the executing component detecting chapter points on the basis of the selected characteristic data and computational method.

11. The information processing device according to claim 8, further comprising:

a heuristic component that generates parameters enabling certain content belonging to a set category to be identified as belonging to the set category;

wherein the identifying component identifies the category of the content on the basis of the parameters generated by the heuristic component.

12. The information processing device according to claim 8, wherein the identifying component receives, as input, parameters enabling certain content belonging to a set category to be identified as belonging to the set category, the set category being generated by an external heuristic device, and the identifying component identifies the category of the content on the basis of the input parameters.

\* \* \* \* \*